United States Patent [19]

Carter et al.

[11] Patent Number: 4,815,508
[45] Date of Patent: Mar. 28, 1989

[54] VENEER LATHE WITH DUAL POWERED BACKUP ROLLS

[75] Inventors: Paul M. Carter, Vancouver; Gary L. Wilson, Richmond; Arthur H. Bucksdrucker, Yarrow, all of Canada

[73] Assignee: Durand-Raute Industries Ltd., New Westminster, Canada

[21] Appl. No.: 91,514

[22] Filed: Aug. 31, 1987

[30] Foreign Application Priority Data

Aug. 28, 1987 [CA] Canada ................................. 545656

[51] Int. Cl.$^4$ ............................................. B27L 5/02
[52] U.S. Cl. ..................................... 144/213; 144/365
[58] Field of Search ................... 144/209 R, 211, 212, 144/213, 365

[56] References Cited

U.S. PATENT DOCUMENTS 4,073,326  2/1978  Pank et al. ............................ 144/213
4,462,442  7/1984  Pointer ................................. 144/213

FOREIGN PATENT DOCUMENTS 1166045  4/1984  Canada .
1202548  4/1986  Canada .

OTHER PUBLICATIONS

"Double Acting Back-up Roll" Drawing of Durand Machine Works Drawing No. B15-93c.
"Rigid Back-up Roll" Drawing of Durand Machine Company 22 No. 1983 Drawing No. B15-0492D-1.
"Rigid Back-up Roll Arr't" Drawing of Durand Machine Company Drawing No. B15-4070-1, 7 Nov. 1980.

*Primary Examiner*—W. Donald Bray
*Attorney, Agent, or Firm*—Chernoff, Vilhauer, McClung & Stenzel

[57] ABSTRACT

A veneer lathe has a frame, a support for rotatably drivingly supporting a peel block, and a knife for peeling veneer from the block. First and second "backup" rolls rotatably, drivingly engage the block during peeling thereof. The first roll is positioned along a first arc which is centred on a first pivot axis; and, the second roll is positioned along a second arc which is centred on the first roll.

11 Claims, 5 Drawing Sheets

VENEER LATHE WITH DUAL POWERED BACKUP ROLLS

FIELD OF THE INVENTION

This application pertains to a spindle type veneer lathe having dual powered backup rolls for stabilizing a peel block during peeling of veneer therefrom. The first backup roll is pivotally positioned along a first arc which is centred on a first pivot axis. The second backup roll is pivotally positioned along a second arc which is centred on the first backup roll.

BACKGROUND OF THE INVENTION

Spindle type veneer peeling lathes conventionally incorporate backup rolls for counteracting the forces imparted to the peel block by the veneer knife as it peels veneer from the block. The backup rolls are positioned against the block, about 90 to 180 degrees of arc away from the knife, and forced against the rotating surface of the block to stabilize the block and preventing it from bowing or lifting away from the knife during the peeling operation.

Early backup rolls were not powered, but merely consisted of a pair of idler rolls which spun freely against the rotating block during the peeling operation. However, idler backup rolls were found to impart significant drag forces to the rotating block, resulting in increased horsepower requirements for driving the lathe spindles to maintain proper peeling of the block. Accordingly, the art evolved powered backup rolls which are drivingly rotated against the block as it is peeled. The driven (or "powered") backup rolls thus contribute to the driving rotation of the block, obviating the need for increased horsepower in the lathe spindle drive motors.

Prior art powered backup rolls have had several configurations, one of which is exemplified by Canadian patent No. 1,166,045 issued Apr. 24, 1984 for an invention of Byron B. Brookhyser et al. entitled "Veneer Lathe Apparatus and Method Using Independently Adjustable Powered Backup Roll". It will be noted that only one of Brookhyser's backup rolls is powered—the second backup roll idles against the block (that is problematic, because the idling roll tends to drag against the block unless its rotational speed is perfectly matched to that of the block, which is very difficult to achieve in practice). Brookhyser's backup rolls are each independently pivotally positionable about a separate pivot axis. Accordingly, Brookhyser provides a first hydraulic cylinder for pivotally positioning the first backup roll with respect to its pivot axis and a second hydraulic cylinder for pivotally positioning the second backup roll with respect to its pivot axis. The two backup rolls and their respective positioning cylinders are in turn mounted on an assembly which is pivotally positioned with respect to the lathe frame by a third hydraulic cylinder. Brookhyser thus requires a rather complicated control system capable of independently actuating each of the three hydraulic cylinders to maintain the two backup rolls in position relative to the peel block.

Another prior art configuration is exemplified by Canadian patent No. 1,202,548 issued Apr. 1, 1986 for an invention of Leonard L. Hayes entitled "Veneer Lathe Drive with Powered Rolls". Hayes' system incorporates three powered drive rolls. A first "reference" drive roll engages the underside of the block and is locked in a predetermined reference position to serve as a reference surface for the block as it is pressed into contact with the reference roll by the other two drive rolls which are mounted on a common support so that they remain a fixed distance apart. The common support on which the other two rolls are mounted is pivotally rotatable about an axis of the lathe frame. Theoretically, the three powered rolls optimally track the block's decreasing diameter as veneer is peeled therefrom. However, it is expected that serious control problems would be encountered in moving Hayes' relatively massive structure through its various operational positions at the speeds demanded of state of the art veneer lathes.

The prior art configurations aforesaid are mechanically complex in that they each incorporate a large number of moving parts. Movement of each part is governed by a separate control element. The various control elements each have inherent positioning errors. The overall configuration is only able to position the backup roll to within a margin of error representative of the cumulative positioning errors inherent to each of the control elements incorporated in the overall configuration. Thus, the inherent positioning error of the overall configuration is proportional to its mechanical complexity. Moreover, mechanically complex configurations like those exemplified by the prior art are potentially unreliable and/or expensive to maintain. Their accuracy is also subject to rapid deterioration caused by normal wear.

The invention overcomes the disadvantages aforesaid in a manner which maintains the capability to independently pivotally position the two backup rolls relative to the block, while eliminating one of the degrees of freedom inherent in the first basic configuration outlined above. The invention considerably simplifies the prior art structures, while eliminating many of their inherent disadvantages and yielding advantages not accomplished by the prior art.

SUMMARY OF THE INVENTION

The invention provides a veneer lathe having a frame, a support means for rotatably, drivingly supporting a peel block, and a knife means for peeling veneer from the block. First and second "backup" rolls are provided for rotatably, drivingly engaging the block during peeling of veneer therefrom. A first roll positioning means positions the first roll along a first arc which is centred on a first pivot axis. A second roll positioning means positions the second roll along a second arc which is centred on the first roll.

A first roll support means supports the first roll for pivotal positioning thereof about the first pivot axis by the first roll positioning means. A second roll support means supports the second roll for pivotal positioning thereof about the first roll by the second roll positioning means. The first roll positioning means may comprise a first cylinder coupled between the first roll support means and the lathe frame for slidable extension and retraction therebetween. The second roll positioning means may comprise a second cylinder coupled between the first roll support means and the second roll support means for slidable extension and retraction therebetween.

Advantageously, the first and second rolls each extend over a substantial portion of the length of the block.

In one embodiment, a knife position sensing means is provided for sensing the position of the knife means and for producing a knife position output signal representative thereof. A first control means controllably actuates the first roll positioning means in response to a first control signal and a second control means controllably actuates the second roll positioning means in response to a second control signal. A signal processing means receives the knife position output signal and produces the first and second control signals in response thereto.

In another embodiment, a first roll position sensing means senses the position of the first roll and produces a first roll position output signal representative thereof. The signal processing means receives the first roll position output signal and produces the first and second control signals in response thereto.

A single drive means may be provided for rotatably driving the first and second rolls. Alternatively, a first roll drive means may be provided for rotatably driving the first roll and a second roll drive means may be provided for rotatably driving the second roll. In the latter case control means may be provided for controllably actuating the first roll drive means to rotate at a first drive speed and for controllably actuating the second roll drive means to rotate at a second drive speed, thereby facilitating optimal matching of the drive roll speeds to rotational speeds at different points on the surface of the rotating block.

DETAILED DESCRIPTION OF THE PREFERRED EMBODIMENT

Figure 1:
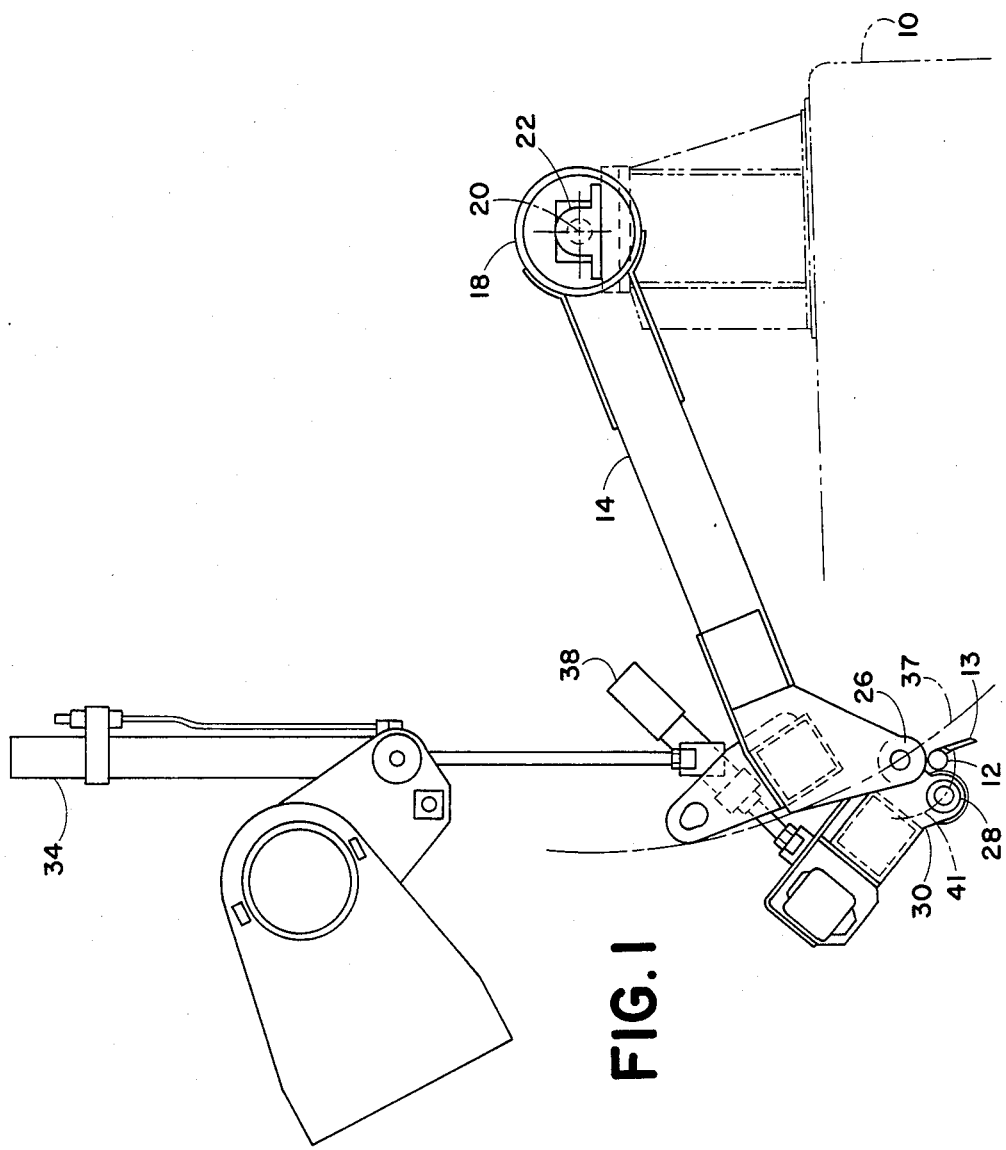
FIG. 1 is a side elevation view of a portion of a veneer lathe having dual powered backup rolls in accordance with the invention.
Figure 2:
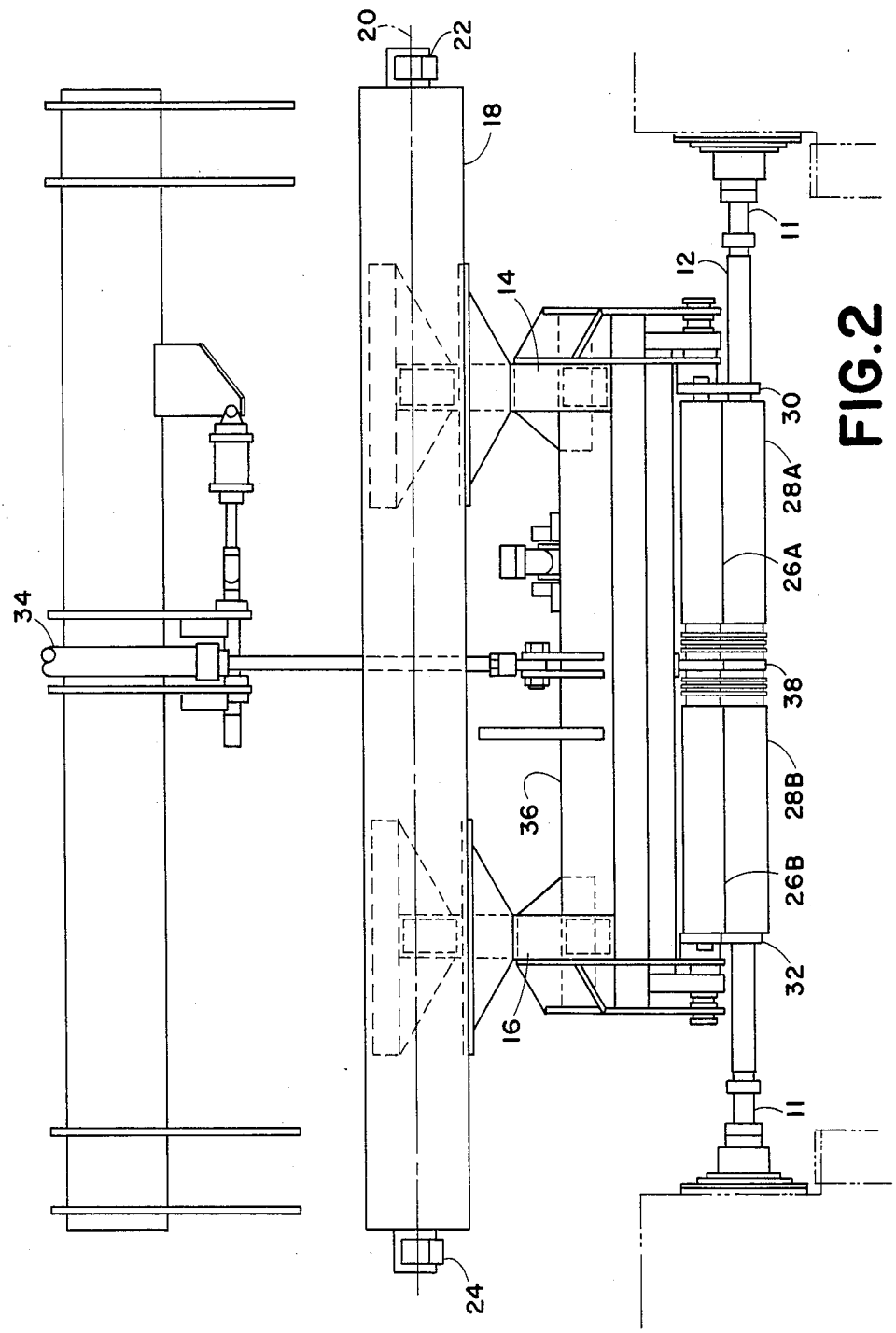
FIG. 2 is a front elevation view of the lathe portion depicted in FIG. 1.
Figure 3:
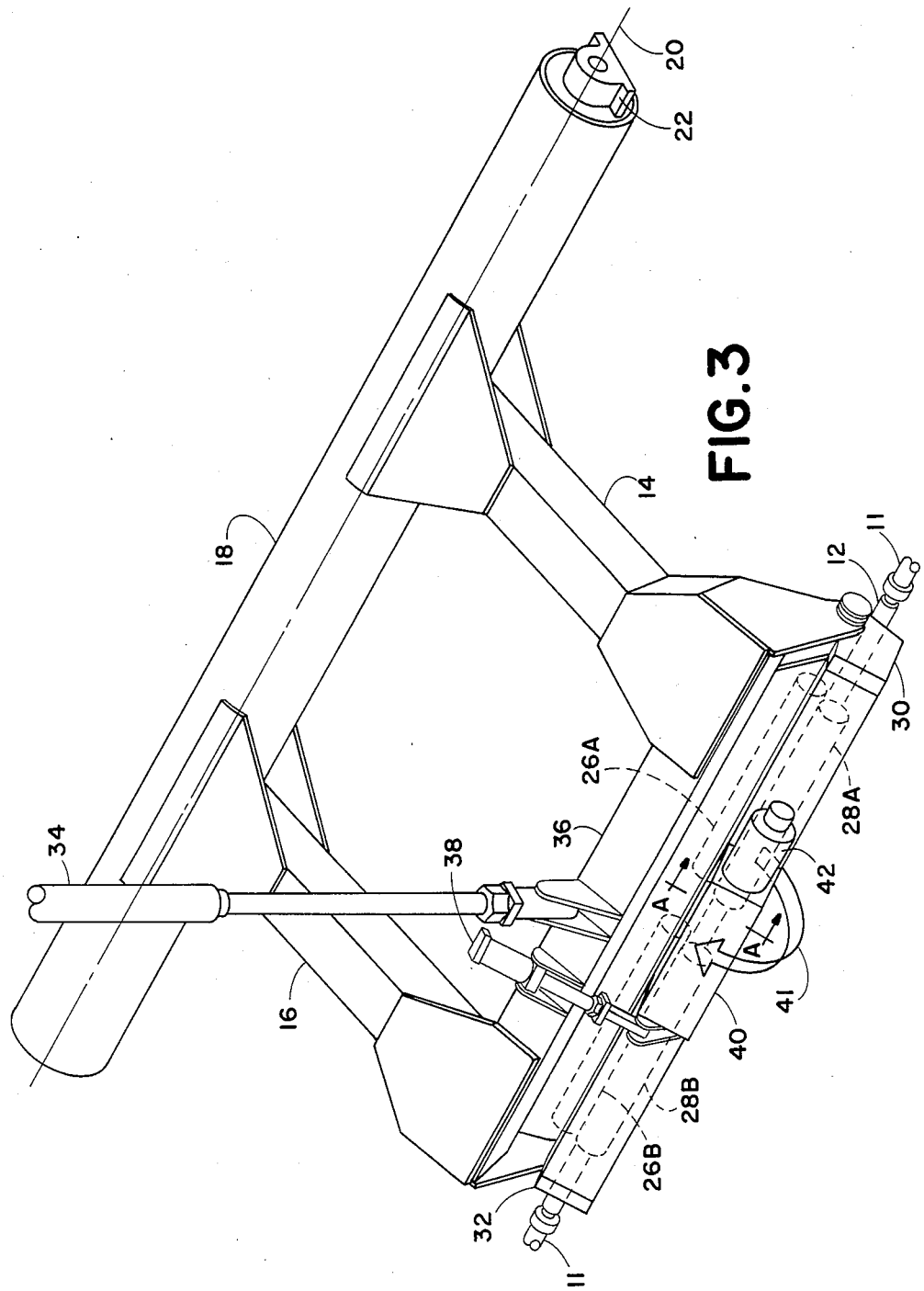
FIG. 3 is a pictorial illustration of the lathe portion illustrated in FIGS. 1 and 2; and, FIG. 4 is a section view taken with respect to line "A"—"A" of FIG. 3; and, FIG. 5 is a block diagram which illustrates the sensor/control circuitry of the preferred embodiment.
Figure 4:
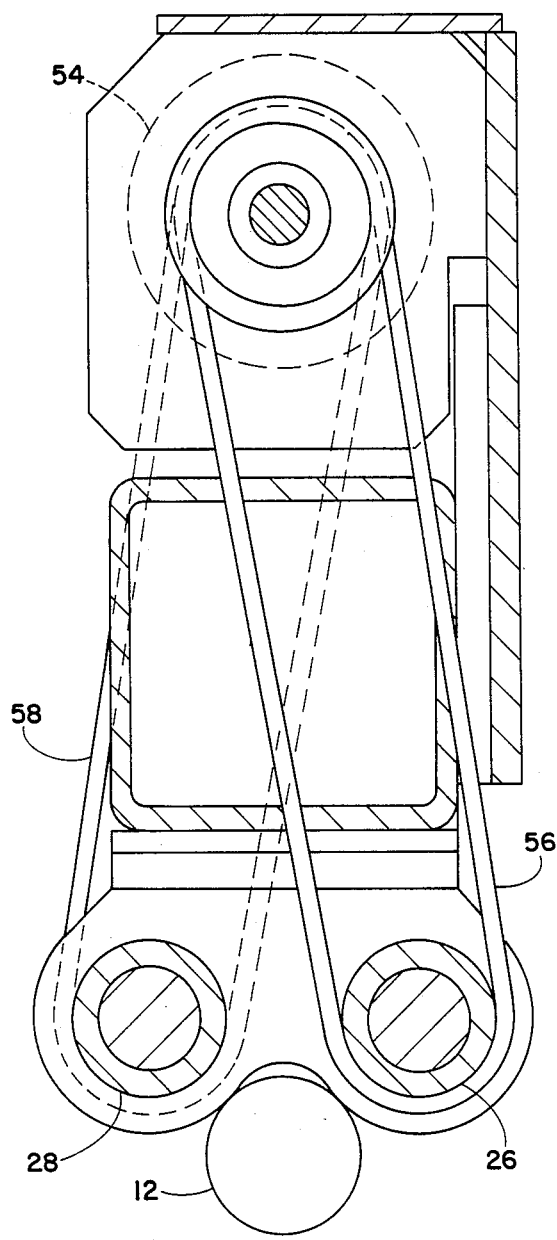
Figure 5:
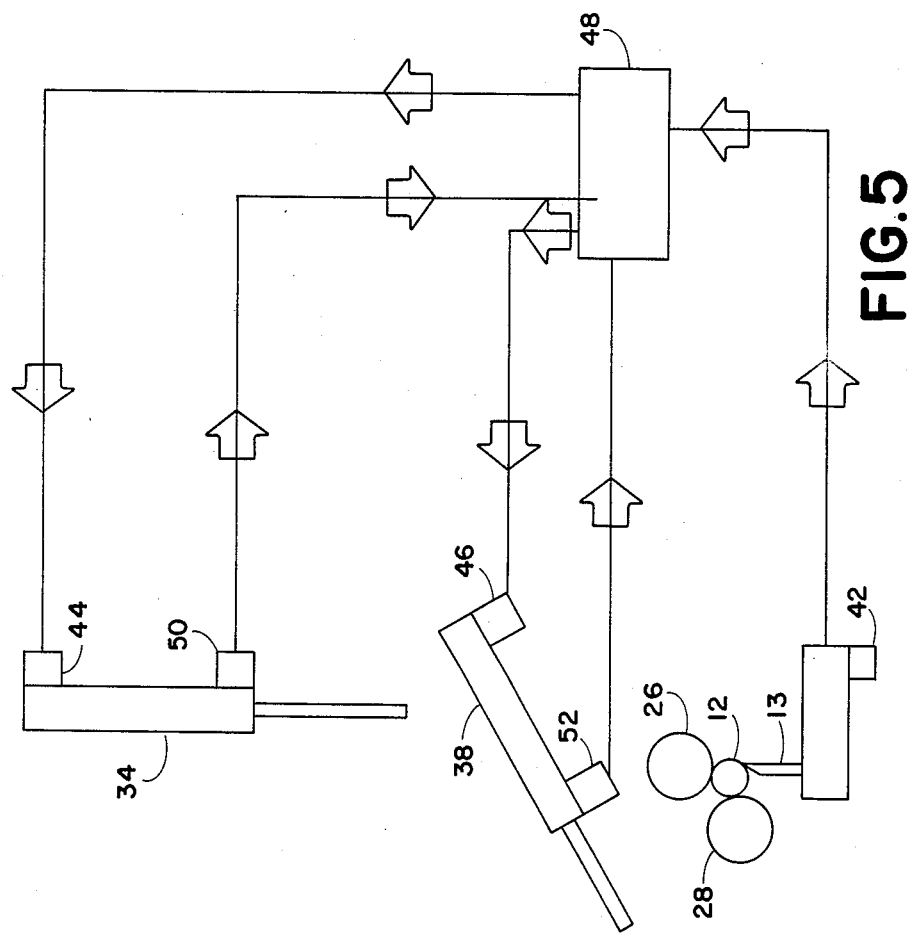

The drawings illustrate a portion of a spindle type veneer lathe having a frame 10. A peel block 12 (which the drawings depict as the minimum diameter core which is left after completion of the veneer peeling operation) is supported between a pair of opposed spindles 11 which constitute a "supporting means" for rotatably, drivingly supporting block 12. A veneer peeling knife 13 is slidably positionable with respect to rotating block 12 for peeling of veneer therefrom.

Backup roll support members 14, 16 are rigidly affixed to cylindrical support 18 which is journaled for rotation about first pivot axis 20 by means of supporting bearings 22, 24 which rotatably support the opposed ends of cylinder 18 relative to lathe frame 10.

First backup roll 26 (which may consist of one or more discrete roller segments 26a, 26b, etc.) is rotatably supported between the ends of support members 14, 16 which together comprise a "first roll support means" for supporting first roll 26 for pivotal positioning thereof about first pivot axis 20 in the manner hereinafter explained. Second backup roll 28 (which may also comprise one or more discrete roller segments 28a, 28b, etc.) is journaled for rotation between the ends of a pair of support arms 30, 32 which are in turn pivotally connected to the ends of support arms 14 and 16, respectively. Support arms 30, 32 constitute a "second roll support means" for supporting second roll 28 for pivotal positioning thereof about first roll 26 in the manner hereinafter explained. More particularly, support arms 30, 32 are pivotally connected to support arms 14, 16 such that the second roll support means pivots on an axis which coincides with the longitudinal axis of first roll 26.

A "first roll positioning means", namely, first cylinder 34 is coupled between the lathe frame and support member 36, which is in turn rigidly affixed between the outer ends of support members 14, 16. Controllable actuation of cylinder 34 accordingly causes slidable extension or retraction thereof which in turn causes the first roll support means and, with it, first roll 26 to pivot along a first arc 37 centred on first pivot axis 20.

A "second roll positioning means", namely, second hydraulic cylinder 38 is coupled between support member 36 and support member 40, which is in turn rigidly connected between the outer ends of support members 30, 32. Slidable extension or retraction of second cylinder 38 causes the aforementioned second roll support means and, with it, second roll 28, to pivot through a second arc 41 centred on the longitudinal axis of first roll 26.

A knife position sensing means 42 is provided for sensing the position of the knife and for producing a knife position output signal representative thereof. First and second control means 44, 46 are respectively provided for controllably actuating first and second cylinders 34, 38 in response to first and second control signals respectively. A signal processing means 48 (i.e. a suitably programmed microprocessor) receives the knife position output signal and produces the first and second control signals in response thereto. Instead of controllably actuating cylinders 34, 38 in response to changes in the position of the knife, one may produce the second control signal (which controllably actuates second cylinder 38) as a function of the position of first cylinder 34. Sensors 50, 52 on cylinders 34, 38 respectively produce signals representative of the position of each cylinder (and therefore representative of the positions of rolls 26, 28 respectively).

Drive motor 54 is drivingly coupled to first and second rolls 26, 28 by means of drive chains 56, 58 respectively. Accordingly, rolls 26, 28 are both driven at the same speed. However, separate drive motors may if desired be provided for each of the two backup rolls, thereby facilitating controllable actuation of the drive speeds of the two rolls and enabling optimal matching of the roll drive speeds to the rotational speed at different points on the surface of the peel block. Provision of separate drive motors also allows torsional load sharing between the rolls, thereby potentially increasing the total drive torque which may be applied to block 12.

As will be apparent to those skilled in the art in the light of the foregoing disclosure, many alterations and modifications are possible in the practice of this invention without departing from the spirit or scope thereof. For example, instead of using hydraulic cylinders as the first and second roll positioning means, one could employ recirculating ball screws driven by D.C. motors to achieve accurate linear positioning. Accordingly, the scope of the invention is to be construed in accordance with the substance defined by the following claims.

We claim:

1. A veneer lathe, comprising:

(a) a frame;
(b) support means for rotatably, drivingly supporting a peel block;
(c) knife means for peeling veneer from said block;
(d) a first roll for rotatably, drivingly engaging said block during peeling thereof;
(e) a second roll for rotatably, drivingly engaging said block during peeling thereof;
(f) first roll positioning means for positioning said first roll along a first are centred on a first pivot axis; and,
(g) second roll positioning means for positioning said second roll along a second arc centred on said first roll.

2. A veneer lathe as defined in claim 1, further comprising first roll support means for supporting said first roll for pivotal positioning thereof about said first pivot axis by said first roll positioning means.

3. A veneer lathe as defined in claim 2, further comprising second roll support means for supporting said second roll for pivotal positioning thereof about said first roll by said second roll positioning means.

4. A veneer lathe as defined in claim 2, wherein said first roll positioning means comprises a first cylinder coupled between said first roll support means and said frame for slidable extension and retraction therebetween.

5. A veneer lathe as defined in claim 4, wherein said second roll positioning means comprises a second cylinder coupled between said first roll support means and said second roll support means for slidable extension and retraction therebetween.

6. A veneer lathe as defined in claim 1, wherein:
(a) said first roll extends over a substantial portion of the length of said block; and,
(b) said second roll extends over a substantial portion of the length of said block.

7. A veneer lathe as defined in claim 1, further comprising:
(a) knife position sensing means for sensing the position of said knife means and for producing a knife position output signal representative thereof;
(b) first control means for controllably actuating said first roll positioning means in response to a first control signal;
(c) second control means for controllably actuating said second roll positioning means in response to a second control signal; and,
(d) signal processing means for receiving said knife position output signal and for producing said first and second control signals in response thereto.

8. A veneer lathe as defined in claim 1, further comprising:
(a) first roll position sensing means for sensing the position of said first roll and for producing a first roll position output signal representative thereof;
(b) first control means for controllably actuating said first roll positioning means in response to a first control signal;
(c) second control means for controllably actuating said second roll positioning means in response to a second control signal; and,
(d) signal processing means for receiving said first roll position output signal and for producing said first and second control signals in response thereto.

9. A veneer lathe as defined in claim 1, further comprising drive means for rotatably driving said first and second rolls.

10. A veneer lathe as defined in claim 1, further comprising first roll drive means for rotatably driving said first roll; and, second roll drive means for rotatably driving said second roll.

11. A veneer lathe as defined in claim 10, further comprising control means for controllably actuating said first roll drive means to rotate at a first drive speed and for controllably actuating said second roll drive means to rotate at a second drive speed.

* * * * *